United States Patent
Duboc (10) Patent No.: US 6,604,163 B1
(45) Date of Patent: Aug. 5, 2003

(54) INTERCONNECTION OF DIGITAL SIGNAL PROCESSOR WITH PROGRAM MEMORY AND EXTERNAL DEVICES USING A SHARED BUS INTERFACE

(75) Inventor: Jean Francois Duboc, Saint Laurent du Var (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/571,191

(22) Filed: May 16, 2000

(51) Int. Cl.[7] .............................................. G06F 9/38
(52) U.S. Cl. ...................... 710/306; 710/21; 711/150
(58) Field of Search .............................. 710/8, 13, 21, 710/22, 27, 31, 62, 63–64, 72, 107, 110, 305, 308, 311, 316, 306, 309; 711/147, 148, 149–150, 168; 712/21–22, 241, 235

(56) References Cited

U.S. PATENT DOCUMENTS

| | | | |
|---|---|---|---|
| 5,301,295 A | | 4/1994 | Leary et al. ................ 395/425 |
| 5,541,862 A | * | 7/1996 | Bright et al. ............... 702/123 |
| 5,638,530 A | * | 6/1997 | Pawate et al. ............... 710/13 |
| 6,041,400 A | * | 3/2000 | Ozcelik et al. ............... 712/35 |
| 6,044,225 A | * | 3/2000 | Spencer et al. ............... 710/72 |
| 6,088,783 A | * | 7/2000 | Morton ........................ 712/22 |
| 6,401,196 B1 | * | 6/2002 | Lee et al. .................... 712/241 |
| 6,430,664 B1 | * | 8/2002 | Chauvel et al. ............. 711/168 |

FOREIGN PATENT DOCUMENTS

| | | |
|---|---|---|
| EP | 0 227 319 A2 | 7/1987 |
| GB | 2 309 324 A | 7/1997 |

* cited by examiner

*Primary Examiner*—Paul R. Myers
*Assistant Examiner*—Raymond N Phan
(74) *Attorney, Agent, or Firm*—Kevin Simons (57) ABSTRACT

A circuit arrangement and method reduce the number of interconnects required for a digital signal processor by utilizing a shared bus to interconnect the digital signal processor to both a program memory and at least one external device. An instruction cache is utilized to cache selected instructions from a DSP program such that, whenever a cached copy of a DSP program instruction is available in the instruction cache, the cached copy can be fetched from the instruction cache instead of the program memory, thereby freeing the shared bus for performing an access to the external device. Caching of instructions and subsequent freeing of the shared bus for external device access may be conditioned on detection of a loop, whereby instructions from the loop are cached in the instruction cache and fetched during subsequent passes through the loop.

17 Claims, 3 Drawing Sheets

INTERCONNECTION OF DIGITAL SIGNAL PROCESSOR WITH PROGRAM MEMORY AND EXTERNAL DEVICES USING A SHARED BUS INTERFACE

FIELD OF THE INVENTION

The invention is generally related to digital signal processor (DSP) circuit arrangements and integrated circuits incorporating the same, and in particular to the interconnection of a digital signal processor with memories and other external devices.

BACKGROUND OF THE INVENTION

As semiconductor fabrication technology advances, designers of integrated circuits are able to integrate more and more functions into a single integrated circuit device, or chip. As such, electronic designs that once required several integrated circuits electrically coupled to one another on a circuit board or module may now be integrated into a single integrated circuit, thereby increasing performance and reducing cost.

One function that has been migrated from discrete circuits to integrated circuits is digital signal processing, which is generally the application of mathematical operations to digitally represented signals. Digital signal processing is utilized in a number of applications, such as to implement filters for audio and/or video signals, to decode information from communications signals such as in wireless or other cellular networks, etc.

Semiconductor fabrication technology has advanced to the point where the logic circuitry that carries out digital signal processing may be carried out by dedicated digital signal processors that execute software programs, referred to herein as DSP programs, to implement specialized DSP algorithms. Moreover, digital signal processors may be embedded in integrated circuits, or chips, with additional logic circuitry to further provide improvements in performance while lowering costs.

Many digital signal processing tasks are characterized by a need to quickly perform repetitive, but relatively simple, mathematical calculations on a large amount of digital data. Multiply-Accumulate (MAC) operations, for example, perform multiplication of two operands and add the result to a running accumulator, and can often be implemented in hardware logic to be performed in a single clock cycle. Multiple MAC units may even be provided so that multiple MAC operations can occur within any given clock cycle. However, some complex filtering operations may require hundreds or thousands of MAC operations to be performed just to calculate one output value at a single point in time.

Given the repetitive nature of many DSP operations, the speed that input data can be retrieved from memory by a digital signal processor, as well as that output data can be written back into memory after being processed (often referred to as memory bandwidth), often has a significant impact on the overall performance of a DSP system.

One manner of increasing memory bandwidth is to utilize multiple communication paths, or buses, to communicate different types of data with a digital signal processor. For example, memory bandwidth can be effectively doubled by providing separate read and write paths with a memory, such that data can be written into a memory at the same time that other data is retrieved from the memory.

Memory bandwidth can also be increased by separating DSP program data and signal data into separate memory spaces, such that separately-accessible program and data memories are used to store DSP program instructions and signal data. Furthermore, digital signal data may be partitioned into multiple memory spaces so that multiple data points can be transferred to or from a given memory at a time. Many conventional DSP systems, for example, partition a data memory into separate X and Y memory spaces, so that, for example, pairs of operands for DSP operations such as MAC operations can be retrieved at the same time.

Often, performance is maximized when program and data memories are integrated onto the same integrated circuit as a digital signal processor, such that direct, high-speed links may be provided between the digital signal processor and the most frequently used information. Nonetheless, a digital signal processor, like just about any other logic circuit, typically needs to support some form of external communication, e.g., so that real world data obtained by other logic circuits can be retrieved and processed, and/or so that DSP results can be returned to other logic circuits for real world utilization. Such other logic circuits, which are generically referred to herein as external devices, may be located on the same integrated circuit, or may be located on other integrated circuits interfaced with the DSP. Typically, external communication with a digital signal processor is provided via a separate communication path, since such communications often are required to be transmitted at a slower rate than the maximum communication rate supported between the digital signal processor and its dedicated memories.

Despite the performance improvements enabled by the use of multiple communication paths to handle program, data and external device communication, multiple communication paths do have an associated cost in terms of connectivity. In particular, each communication path with a digital signal processor typically requires a relatively large number of electrical conduction paths. The more communication paths that are incorporated into a design therefore can significantly increase the overall number of conduction paths required in the design.

For example, an exemplary digital signal processor that supports separate X and Y data spaces with simultaneous bi-directional capability, and with each data space utilizing 16-bit addressing and 32-bit data, would require 192 data and address lines, along with a number of additional control signals. Assuming a separate program memory space of 20-bits with simultaneous bi-directional capability, and an external device address space of 16-bits with simultaneous bi-directional capability, and the total number of data and address lines required becomes 392.

When a digital signal processor is not integrated with any of the associated memories on the same integrated circuit, a large number of external interconnects, typically pins, are required. Integrated circuits, however, are often extremely limited in the amount of available interconnects, and the use of additional interconnects can increase manufacturing costs. Moreover, even when one or more of the associated memories are integrated onto the same integrated circuit device as the digital signal processor, placement and routing of logic circuitry and interconnects in a design can be complicated by the need for excessive interconnects, often increasing design costs, or requiring additional layers of circuitry to accommodate all interconnects, thereby increasing manufacturing costs as well. Additional interconnects may also adversely impact performance should the length of any interconnects be required to be increased, as increased interconnect length can increase propagation delay in an integrated circuit and thereby limit the permissible operational speed of the design.

Therefore, a significant need continues to exist in the art for a manner of better balancing system performance and memory bandwidth in a digital signal processor design with the interconnectivity requirements of the design.

SUMMARY OF THE INVENTION

The invention addresses these and other problems associated with the prior art by providing a circuit arrangement and method that reduce the number of interconnects required for a digital signal processor without significantly adversely impacting memory bandwidth by utilizing a shared bus to interconnect the digital signal processor to both a program memory and at least one external device. An instruction cache is utilized in association with the shared bus to cache selected instructions from a DSP program such that, whenever a cached copy of a DSP program instruction is available in the instruction cache, the cached copy can be fetched from the instruction cache instead of the program memory, thereby freeing the shared bus for performing an access to the external device.

Consistent with one aspect of the invention, a data bus interface is also provided to separately interface the digital signal processor with a data memory, such that the digital signal processor is capable of concurrently fetching an instruction from the instruction cache, communicating with the data memory over the data bus interface, and communicating with the external device over the shared bus.

Consistent with another aspect of the invention, the fetching of instructions from the instruction cache is performed responsive to detection of a loop during execution of a DSP program. A subset of instructions from the loop are cached in the instruction cache during a first pass through the loop, and in response to detection of the loop. Then, during a subsequent pass through the loop, instructions from the subset of instructions are fetched from the instruction cache instead of the program memory.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The herein described embodiments utilize a shared bus architecture in a digital signal processing environment to communicate both instructions with a program memory and external device data with an external device. An instruction cache caches selected instructions from a DSP program, and when cached copies of requested instructions are available in the instruction cache, the shared bus is freed for external device data transfers over the shared bus.

Typically, maximized performance gains are realized when the maximum number of instructions fetched and executed from a DSP program can be retrieved from the instruction cache. As such, any mechanism or algorithm that can increase the likelihood of an instruction being cached is desirable. A DSP environment, in particular, has been found to be rather conducive to instruction caching, since many DSP algorithms are highly repetitive in nature, whereby a relatively few number of instructions are executed a relatively large number of times during program execution. Identifying such repetitive instructions and conditioning control over a shared bus to detect and account for such repetitive instructions is therefore one manner of maximizing performance of a DSP environment incorporating a shared bus consistent with the invention. In the illustrated embodiment, for example, loops of instructions in a DSP program are detected during execution, such that execution of instructions during multiple passes through a loop can be utilized to release control of the shared bus for external device access. Other manners of identifying and accommodating repetitive DSP instructions will be apparent to one of ordinary skill in the art having the benefit of the instant disclosure, and as such, the invention is not limited to this particular implementation.

Figure 1:
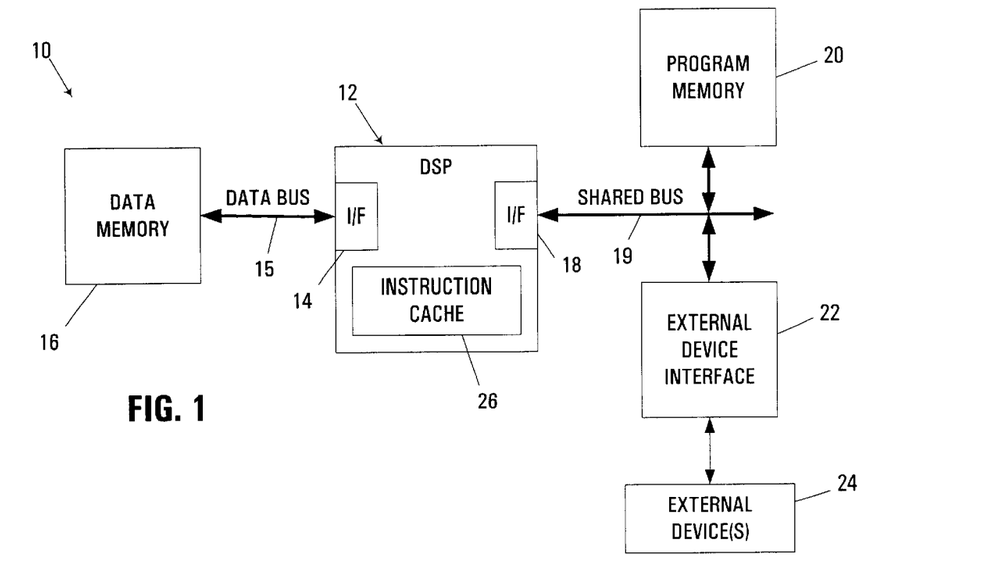
FIG. 1 is a block diagram of a digital signal processor circuit arrangement incorporating a shared bus consistent with the invention.

Turning to the drawings, wherein like numbers denote like parts throughout the several views, FIG. 1 illustrates a circuit arrangement 10 consistent with the invention. In the illustrated implementation, circuit arrangement 10 is disposed on a single integrated circuit device, or chip. Circuit arrangement 10 includes a digital signal processor (DSP) 12 including a data bus interface 14 coupled to a data bus 15 to provide communication with a data memory 16. Data memory 16 may be partitioned into one or more data spaces, e.g., X and Y data spaces. Moreover, data bus 15 may include multiple communication paths to provide concurrent operations with the data memory space.

In the illustrated embodiment, for example, data bus 15 may incorporate simultaneous bi-directional communication between each of the two data spaces (X and Y data spaces) within the data memory. With each communication path including an address bus and a data bus, data bus 15 may incorporate two address buses for each data space, as well as four mono-directional data buses for each data space, for a total of twelve buses comprising data bus 15. Any number of widths may be used for any of the buses, e.g., 16-bits, whereby a total of 192 communication lines may be provided in data bus 15. Additional control lines, e.g., read/write control lines, enable lines, clock distribution lines, etc. may also be incorporated into data bus 15, as is well known in the art. Moreover, it will be appreciated by one of ordinary skill in the art that any number of alternate data space implementations may be utilized consistent with the invention.

To provide both program and external device connectivity for DSP 12, a shared bus interface 18 coupled to a shared bus 19 is utilized to interface the DSP with a program memory 20 and an external device interface 22. As with data bus 15, shared bus 19 may incorporate separate address and data paths, as well as multiple address paths to provide simultaneous bi-directional connectivity. For example, in the illustrated implementation, shared bus 19 may incorporate two address buses of 20-bits in width each, along with four mono-directional program data buses of 16-bits in width, with pairs of data buses logically coupled to provide a 32-bit width in the address space.

External device interface 22 provides an interface between shared bus 19 and one or more external devices 24. The external devices may be disposed on the same integrated circuit, or may be external to the circuit and in electrical communication therewith. Examples of types of external devices that may be accessed in this manner include analog to digital or digital to analog converters working at low frequency versus DSP frequency, debug ports, chip configuration registers which are read or written during the chip initialization phase, communication ports (serial or parallel) to a host computer or any other hardware resource that does not require a high frequency.

Each of interfaces 14, 18 and 22 typically includes termination points to couple to the respective buses, as well as appropriate buffer and control logic to implement the necessary interface with the appropriate bus. Implementation of suitable interfaces for each of buses 15 and 19 would be well within the ability of one of ordinary skill in the art having the benefit of the instant disclosure.

As discussed above, DSP 12 utilizes an instruction cache, e.g., cache 26, to cache instructions from a DSP program stored in the program memory 20 such that the process of fetching instructions for execution by the DSP can be offloaded from the shared bus, and thereby free the shared bus for external device communication. Instruction cache 26 may be integrated within DSP 12, or may be in electrical communication therewith in another area of the integrated circuit.

Each of data memory 16, program memory 20 and instruction cache 26 may be implemented utilizing any of a number of known memory technologies, including, for example, SRAM, DRAM and other volatile or non-volatile solid state memory technologies. Program memory 20 may also be implemented in whole or in part with read only memory (ROM) should modification of the DSP program stored in the program memory not be required for the particular application within which circuit arrangement 10 is used.

With DSP program instructions stored in instruction cache 26, it may be seen that the combination of data bus interface 14, shared bus interface 18 and instruction cache 26 permit concurrent communication (e.g., during the same clock or memory access cycle) with the data memory, an external device, and the instruction cache for retrieval of an instruction from a DSP program being executed by the DSP. When operating with such concurrent transmission capability, it may therefore be seen that circuit arrangement 10 may provide the same effective bandwidth as a conventional DSP design incorporating separate program and external device buses. However, through the use of the shared bus, the number of interconnects is significantly reduced (e.g., as many as ninety-six interconnects plus associated control signals if two address buses and four mono-directional data buses, each of 16-bits in width was used to implement the external device interface).

While all of the components in circuit arrangement 10 are illustrated as being integrated onto a single integrated circuit device, or chip, it will be appreciated that any of the components may be disposed on separate integrated circuits electrically coupled to the integrated circuit incorporating the digital signal processor. As such, any of the buses illustrated in FIG. 1 may be implemented using on-chip wiring or via separate transmission lines, utilizing electrical and/or optical media to implement each transmission line.

Moreover, as is well known in the art, integrated circuit devices are typically designed and fabricated using one or more computer data files, referred to herein as hardware definition programs, that define at various levels of detail the functionality and/or layout of the circuit arrangements on the devices. The programs are typically generated by a design tool and are subsequently used for simulation and/or during manufacturing to create the layout masks that define the circuit arrangements applied to a semiconductor wafer. Typically, the programs are provided in a predefined format using a hardware definition language (HDL) such as VHDL, Verilog, EDIF, etc. While the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, (among others), and transmission type media such as digital and analog communications links.

Figure 2:
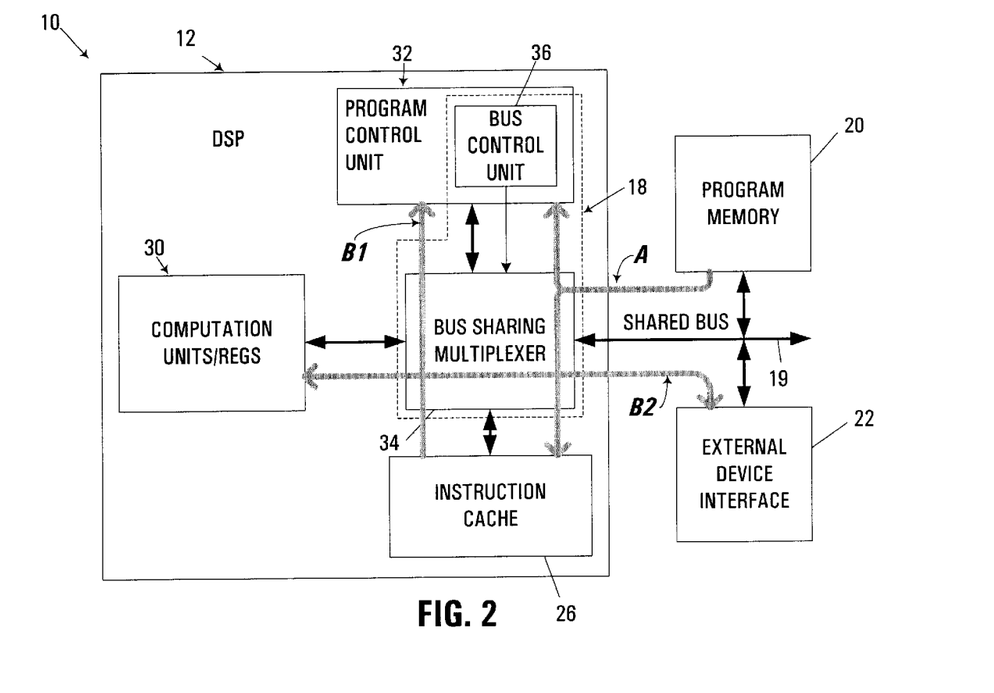
FIG. 2 is a block diagram of the circuit arrangement of FIG. 1, illustrating the control logic associated with implementing a bus sharing algorithm consistent with the invention.

FIG. 2 next illustrates the primary components in circuit arrangement 10 for implementing bus sharing in a manner consistent with the invention. In particular, DSP 12 is illustrated in greater detail, including computation units/registers 30 that are used to perform digital signal processing operations and a program control unit 32 that is utilized to control the fetching and execution of instructions for a DSP program stored in program memory 20. Program control unit 32 typically includes an instruction decoder as well as a program counter that controls the addressing for fetching instructions from the DSP program stored in the program memory, the configuration of which is well known in the art.

Shared bus interface 18 is illustrated as including a bus sharing multiplexer 34 and a bus control unit 36. Bus sharing multiplexer 34 supports a number of data paths in circuit arrangement 10. One path defined through the bus sharing multiplexer, for example, is an instruction path A from program memory 20 to both of program control unit 32 and instruction cache 26. A second instruction path, denoted B1, is defined through the multiplexer from instruction cache 26 to program control unit 32. A third communication path B2 is defined between external device interface 22 and computation units/registers 30.

Multiplexer 34 is under the control of a bus control unit 36 that selects one of two operating modes. In a first operating mode, referred to herein as a program memory access mode, bus sharing multiplexer 34 is configured to activate data path A. In a second, external device access mode, multiplexer 34 is configured to activate both of data paths B1 and B2 such that the shared bus is utilized to communicate external device data, while instructions are provided to the program control unit by the instruction cache.

Figure 3:
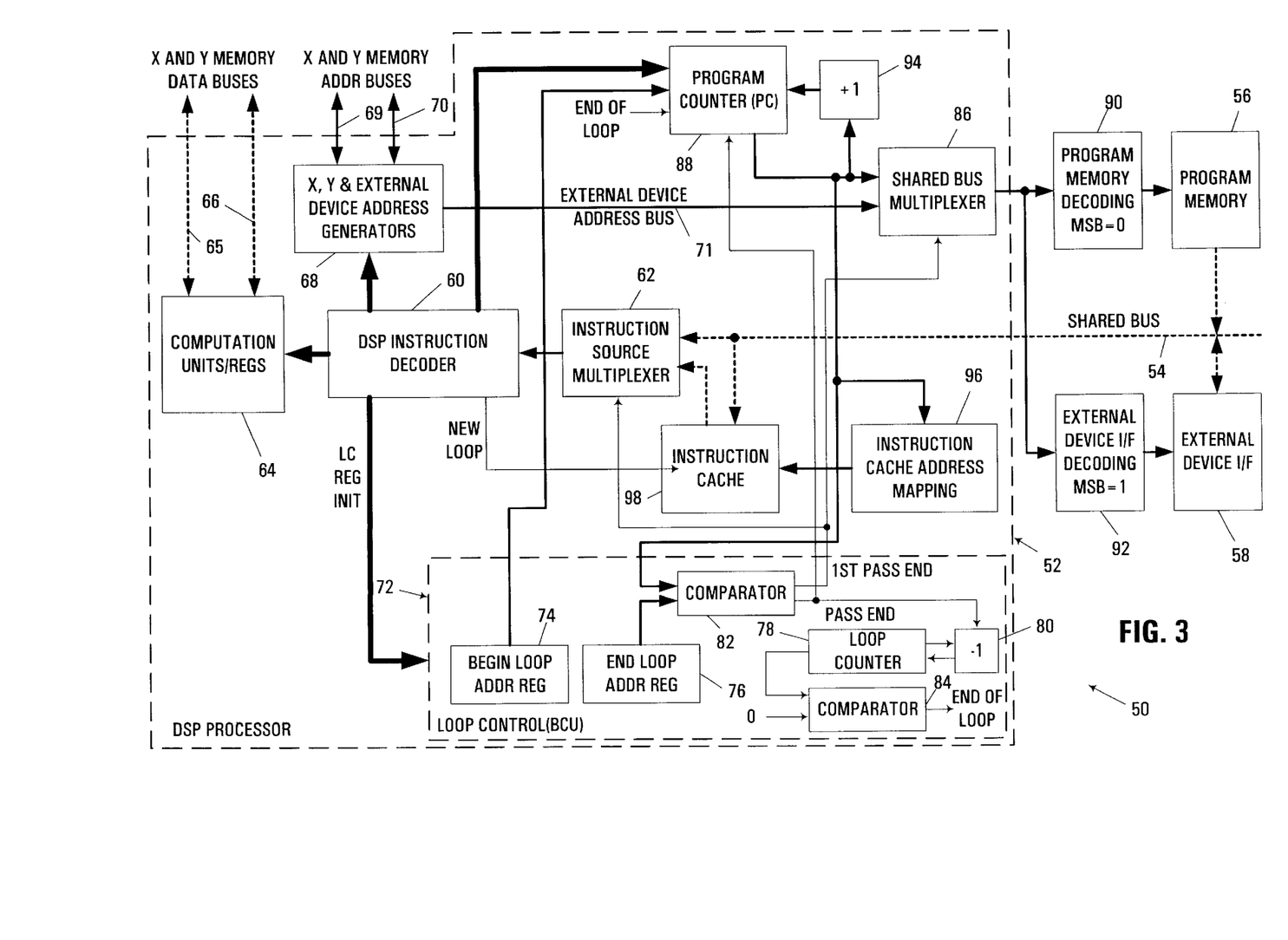
FIG. 3 is a block diagram of one specific implementation of a digital signal processor circuit arrangement incorporating a shared bus consistent with the invention.

The mechanism by which bus control unit 36 controls bus sharing multiplexer 34 may vary in different embodiments. One specific implementation of the invention, which utilizes loop-based control of a multiplexer, is illustrated in greater detail in FIGS. 3 and 4. Specifically, FIG. 3 illustrates a circuit arrangement 50 incorporating a DSP 52 coupled via a shared bus 54 to a program memory 56 and external device interface 58. In FIG. 3, thickened dash lines are used to illustrate data lines in the various buses, while thickened solid lines are utilized to illustrate address lines. The thickest lines from an instruction decoder 60 represent the control signals generated in response to retrieval and decoding of a DSP instruction from a DSP program stored in program memory 56.

Instruction decoder 60 is provided with instructions by an instruction source multiplexer 62, one input of which is coupled to the data lines of shared bus 54, and the other input of which is coupled to the output of an instruction cache 98. Shared bus 54 is also coupled to instruction cache 98 to provide instructions output by the program memory to the instruction cache for caching of the instructions, as will be described in greater detail below.

In response to received instructions, instruction decoder 60 controls a set of computation units and registers 64 to perform various DSP operations, in a manner well known in the art. The computation units and registers are coupled to the X and Y data memories via data buses 65 and 66. Instruction decoder 60 further controls a set of address generators 68 to initiate accesses to the X and Y data memory spaces (via address lines 69 and 70) and to initiate external device accesses over address line 71.

Instruction decoder 60 also provides a set of loop control register initialization signals to a loop control 72, functioning as a bus control unit in the illustrated implementation. Furthermore, instruction decoder 60 outputs a new loop control signal to instruction cache 98. Both the new loop control signal and the loop control register initialization signals are output by instruction decoder 60 in response to detection of an appropriate instruction that initiates a loop.

Various instructions may be decoded as defining a loop. For example, with the instruction set utilized by the PalmD-SPCore and OakDSPCore cores (among others) from DSP Group, Inc., which is one of a number of different conventional programmable DSP architectures, instructions such as repeat and block repeat may initiate the generation of the loop control signals to loop controller 72 and instruction cache 98. For other architectures, other instructions may initiate loop processing in the manner discussed below.

Loop control 72 includes a begin loop address register 74 and an end loop address register 76, which respectively define a subset of the instructions from the program memory that are executed in multiple passes during execution of a loop. Registers 74 and 76 are initialized with the beginning and ending addresses of the instructions to execute during each pass of a loop by instruction decoder 60. In the illustrated implementation, all of the instructions that are executed during a loop are represented in the range defined between the values stored in registers 74 and 76; however, in other embodiments, only a portion of the instructions that are executed during each pass of a loop may be cached.

Loop control 72 also includes a loop counter 78, which counts the number of passes through a detected loop. Counter 78 is typically initialized by instruction decoder 60 concurrently with initialization of registers 74 and 76, e.g., through analysis of the instruction that initiates the loop. Loop counter 78 is selectively decremented for each pass of a loop by a decrement block 80, which is controlled via a pass end signal output by a comparator 82. Comparator 82 receives as its inputs the end loop address register output 76, as well as the output of a program counter 88, representing the address of the current instruction being processed by the DSP. As a result, comparator 82 outputs the pass end signal whenever a match is detected between the output of the program counter and register 76, thereby signifying the end of a pass through the loop.

A second comparator 84 is coupled to the output of loop counter 78, the other input of which is connected to a null value to detect the completion of the last pass through the loop. The output of comparator 84, designated an end of loop signal, is provided to program counter 88 along with the pass end signal output by comparator 82. Program counter 88 also receives as input the output of register 74, and is configured to load the contents of register in response to the assertion of the pass end signal when the end of loop signal is not asserted. As such, whenever a non-final pass through the loop is completed, program counter 88 will be loaded with the starting address of the loop such that the next iteration or pass through the loop can begin.

It will be appreciated that, rather than decrementing a loop counter that has been initiated with a loop value and comparing the results to zero, other embodiments may initialize a loop counter at zero, increment the counter each pass through the loop, and compare the results to a maximum loop count as determined by the instruction decoder.

Comparator 82 also includes a second output, designated as the first pass end signal, which is asserted only upon the completion of a first pass through the loop. After being set, the first pass end signal is typically held in an asserted state until completion of the loop. This output is fed to instruction source multiplexer 62, as well as to a shared bus multiplexer 86, which receives as input the program counter output and the external device address lines 71.

The first pass end signal operates as a mode select signal to switch the shared bus interface between a program memory access mode and an external device access mode. Specifically, prior to completion of the first pass (or if no loop is being processed), the first pass end signal is not asserted. When not asserted, instruction source multiplexer 62 selects shared bus 54 as the input to pass to instruction decoder 60. In addition, shared bus multiplexer 86 defaults to coupling the output of program counter 88 to the address lines of shared bus 54. However, upon completion of the first pass of a loop, and until the loop is complete, the first pass end signal is asserted, switching the input of multiplexer 62 to couple the output of the instruction cache 98 to the instruction decoder 60. In addition, multiplexer 86 is activated to couple external device address lines 71 to the address lines of shared bus 54 to permit external device access over the shared bus. An instruction cache address mapping block 96 simultaneously maps the requested instruction into an instruction cache address such that the instructions forwarded by the shared bus are stored in an appropriate and retrievable location.

The output of shared bus multiplexer 86 is provided to a pair of decoders 90, 92 to decode the address specified on the address lines as being directed to either the program memory 56 or the external device interface 58. Various decoding mechanisms may be utilized; however, in the illustrated embodiment, a simple decoding scheme is used, whereby the most significant bit (MSB) of the address is used to select between program and external device memory spaces. Thus, if the MSB of the address output by multiplexer 86 is "0", the program memory is accessed, while if the MSB is set to "1", the external device memory space is accessed.

Program counter 88 is capable of being loaded with a number of values upon each clock cycle. Instruction decoder 60 may load the program counter, e.g., in response to a JUMP instruction. In addition, the program counter may be loaded by the loop control upon completion of a non-final pass through a loop. Moreover, the program counter may simply be incremented on each clock cycle in response to an increment block 94 coupled between the output of the program counter and input thereto.

Instruction cache 98 may be accessed in any number of manners known in the art for caches. For example, an instruction cache address mapping block 96 may be coupled to the output of program counter 88, and used to map an instruction address into a corresponding address in the instruction cache for accessing the appropriate location in the instruction cache to retrieve the cached copy of the instruction requested via the current address stored in the program counter.

It will be appreciated that various instruction cache architectures may be used consistent with the invention, including various degrees of associativity, various hashing mechanisms, etc.

It will also be appreciated that additional circuitry (not shown) may also be utilized to resolve bus contentions whenever it is desirable to access an external device while in program memory access mode. Any number of conventional arbitration mechanisms, e.g., always prioritizing program memory accesses, or always prioritizing external device accesses, may be utilized. Typically, such functionality would be implemented in the DSP utilizing logic circuitry to compare the read/write signals linked to the instruction address bus and the external device address bus, and if a conflict is detected, to stall the external device access (if instruction accesses are prioritized) by stopping the clock or any other wait state mechanism, processing the instruction access, then stalling the instruction address bus and processing the external device access. In some embodiments, no arbitration logic may be required, e.g., if any potential conflicts can be resolved during compilation of the DSP program using instruction reordering or other known techniques.

Figure 4:
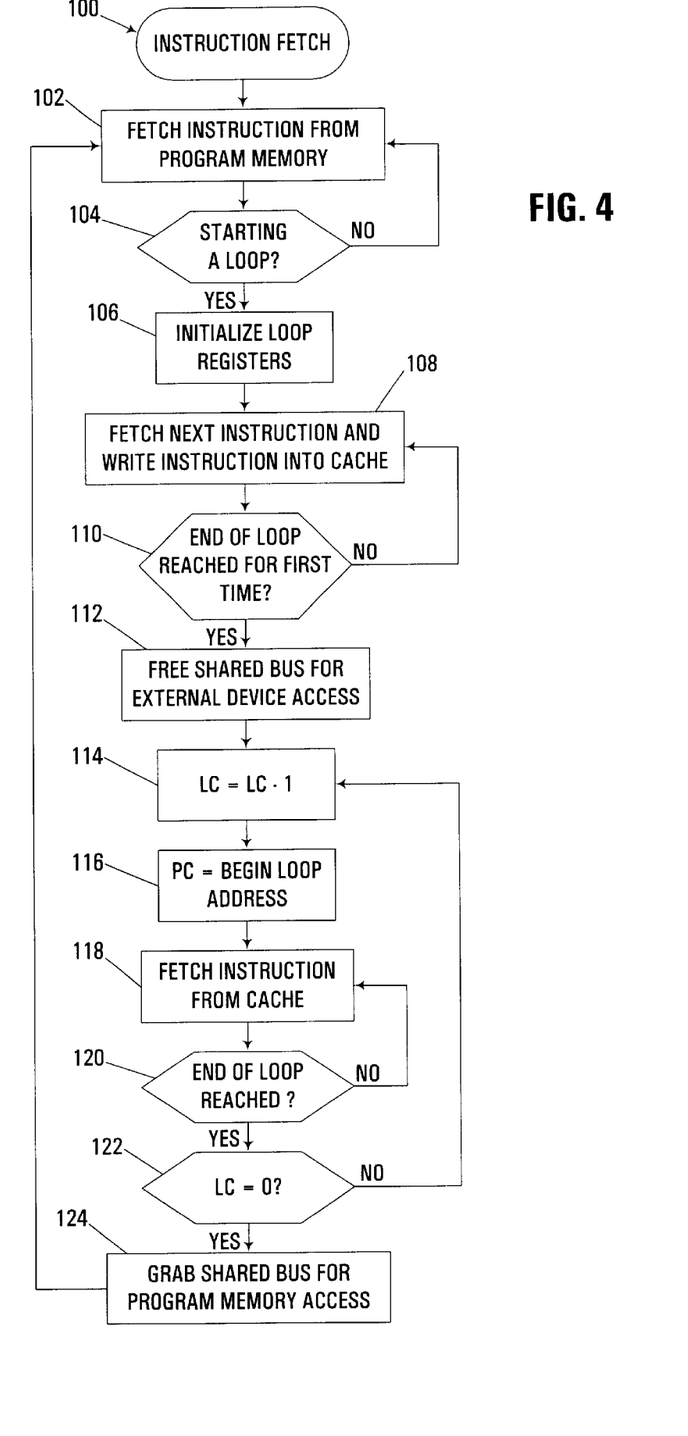
FIG. 4 is a flowchart illustrating an instruction fetch algorithm utilized by the circuit arrangement of FIG. 1.

FIG. 4 illustrates the operation of the circuit arrangement shown in FIG. 3 in performing instruction fetch operations consistent with the invention. In particular, an instruction fetch routine 100 is illustrated beginning at block 102 where an instruction is fetched from the program memory for decoding and execution. During block 102, it will be appreciated that both multiplexers 62, 86 are in program memory access mode, and the loop initialization signals output by instruction decoder 61 are not asserted. Next, in block 104, it is determined whether the fetched instruction initiates a loop. If not, control returns to block 102 to fetch the next instruction from the program memory, thus operating in a conventional manner of processing DSP instructions.

If, however, a loop is detected, control passes to block 106 to assert the loop control register initialization signals to initialize the loop registers with the beginning and ending addresses of the subset of instructions to be executed in multiple passes, as well as the total number of passes to execute, which is stored in loop counter 78. In addition, at this time the new loop signal to instruction cache 98 is asserted to initiate the caching of instructions from a loop in the DSP program.

Next, block 108 fetches the next instruction, and by virtue of the assertion of the new loop signal, the instruction is concurrently written into the instruction cache and an appropriate location as defined by the instruction cache address mapping. Control then passes to block 110 to determine whether the end of the loop has been reached for the first time. If not, control returns to block 108 to process additional instructions. If, however, the end of the loop is reached for the first time (as determined by the program counter matching the value stored in register 76), control passes to block 112 to free the shared bus for external device access—typically by asserting the first pass end signal output by comparator 82.

Next, block 114 decrements the loop count (LC) stored in loop counter 78, in response to assertion of the pass end signal from comparator 82. Next, block 116 loads the program counter with the begin loop address stored in address register 74, again by virtue of assertion of the pass end signal from comparator 82.

Next, control passes to block 118 to fetch an instruction from the instruction cache, which occurs as a result of assertion of the first pass end signal by comparator 82. Control then passes to block 120 to detect whether an end of loop has been reached, based upon the matching of the end loop address register contents with the program counter. If the end of the loop has not been reached, control returns to block 118 to fetch additional instructions from the cache. If the end of the loop is reached, however, control passes to block 122 to determine whether the current value of the loop count is equal to "0"—that is, whether the output of comparator 84 is asserted. If not, control passes to block 114 to decrement the loop count, load the program counter with the begin loop address, and initiate another pass through the loop. If, the loop count is equal to "0", block 122 passes control to block 124 to grab the shared bus for program memory access, in particular by deasserting the first pass end signal from comparator 82 to return multiplexers 62, 86 to their default states. Moreover, given that the end of loop signal is asserted, the program counter will not be reloaded with the begin loop address register, and thus, will be loaded with the next address following the loop.

To further illustrate the operation of the illustrated embodiment, Table 1 below illustrates a representative DSP program including a plurality of instructions, a subset of which (shown in lines 6–16 of the program) representing a subset of instructions that are executed in the multiple passes of a loop (defined by a loop instruction in line 5 of the program):

TABLE 1

EXAMPLE DSP PROGRAM

| | |
|---|---|
| 1 | inst1 |
| 2 | inst2 |
| 3 | inst3 |
| | . . . |
| 4 | instn |
| 5 | loop begin |
| 6 | inst loop1 |
| 7 | inst loop2 |
| 8 | inst loop3 |
| 9 | inst loop4 |
| 10 | inst loop5 |
| 11 | inst loop6 |
| 12 | inst loop7 |
| 13 | inst loop8 |
| 14 | inst loop9 |
| 15 | inst loop10 |
| 16 | inst loop11 |
| 17 | end loop |
| 18 | inst n + 1 |
| 19 | inst z |

Table II below illustrates the execution of such a program by the circuit arrangement of FIG. 3, assuming a three-stage pipeline where instructions are fetched, decoded and executed during the three stages of the pipeline:

TABLE II

EXAMPLE DSP PROGRAM EXECUTION

| DSP FETCH | DSP DECODE | DSP EXECUTE | COMMENTS |
|---|---|---|---|
| inst1 | | | |
| inst2 | inst1 | | |
| inst3 | inst2 | inst1 | |
| ... | ... | ... | |
| instn | instn-1 | instn-2 | |
| loop begin | instn | instn-1 | |
| inst loop1 | loop begin | instn | |
| inst loop2 | inst loop1 | loop begin | Start the loop execution now. Store the loop instructions inside the cache |
| inst loop3 | inst loop2 | inst loop1 | |
| inst loop4 | inst loop3 | inst loop2 | |
| inst loop5 | inst loop4 | inst loop3 | |
| inst loop6 | inst loop5 | inst loop4 | |
| inst loop7 | inst loop6 | inst loop5 | |
| inst loop8 | inst loop7 | inst loop6 | |
| inst loop9 | inst loop8 | inst loop7 | |
| inst loop10 | inst loop9 | inst loop8 | |
| inst loop11 | inst loop10 | inst loop9 | |
| loop begin | inst loop11 | inst loop10 | End of loop reached. Fetch now from the cache |
| inst loop1 | loop begin | inst loop11 | Access to slow devices using program bus can happen now in parallel |
| inst loop2 | inst loop1 | loop begin | |
| inst loop3 | inst loop2 | inst loop1 | |
| inst loop4 | inst loop3 | inst loop2 | |
| inst loop5 | inst loop4 | inst loop3 | |
| inst loop6 | inst loop5 | inst loop4 | |
| inst loop7 | inst loop6 | inst loop5 | |
| inst loop8 | inst loop7 | inst loop6 | |
| inst loop9 | inst loop8 | inst loop7 | |
| inst loop10 | inst loop9 | inst loop8 | |
| inst loop11 | inst loop10 | inst loop9 | |
| inst n+1 | inst loop11 | inst loop10 | End of loop reached, last pass detected |
| inst z | inst n+1 | inst loop11 | Bus configured to perform program memory accesses |
| | inst z | inst n+1 | |
| | | inst z | |

It should be noted that the example execution assumes a loop that is executed in only two passes. Additional passes would proceed in much the same manner as the second pass above.

Various modifications may be made to the illustrated embodiments without departing from the spirit and scope of the invention. For example, rather than basing control over detection of a loop, control over the shared bus interface may be based upon detection of other types of instructions that are frequently accessed and thus suitable for caching in an instruction cache. For example, certain subroutines that are called on a frequent basis could be detectable and utilized to control access to the shared bus.

Other modifications will be apparent to one of ordinary skill in the art having the benefit of the instant disclosure. Therefore, the invention lies in the claims hereinafter appended.

What is claimed is:

1. A circuit arrangement for use in executing a digital signal processor (DSP) program to process digital signal data, the circuit arrangement comprising:

(a) a data bus interface configured to interface with a data memory over a data bus so as to communicate digital signal data with the data memory;

(b) a shared bus interface configured to interface with a program memory and an external device over a shared bus having an address bus and a data bus so as to communicate instructions from a DSP program with the program memory, and to communicate external device data with the external device;

(c) an instruction cache configured to cache at least one instruction from the DSP program;

(d) a digital signal processor coupled to the data bus interface, the shared bus interface, and the instruction cache, the digital signal processor configured to concurrently retrieve an instruction from the DSP program from the instruction cache, communicate with the data memory over the data bus interface, and communicate with the external device over the shared bus interface;

(e) wherein the digital signal processor includes:

(1) an instruction decoder configured to decode instructions from the DSP program;

(2) a program control unit coupled to the instruction decoder and configured to generate instruction address requests for instructions from the DSP program;

(3) an address generator coupled to the instruction decoder and configured to generate external device address requests for accessing the external device; and (4) a bus control unit coupled to the instruction decoder and configured to select one of a program memory access mode and an external device access mode for the shared bus; and (f) wherein the shared bus interface includes:

(1) a first multiplexer coupled to the bus control unit and configured to couple the program control unit to the address bus from the shared bus when the program memory access mode is selected, and to couple the address generator to the address bus from the shared bus when the external device access mode is selected; and (2) a second multiplexer coupled to the bus control unit and configured to couple the data bus from the shared bus to the instruction decoder when the program memory access mode is selected, and to couple the instruction cache to the instruction decoder when the external device access mode is selected.

2. The circuit arrangement of claim 1, further comprising:

(a) a data memory coupled to the data bus interface;

(b) a program memory coupled to the shared bus interface; and (c) an external device interface coupled to the shared bus interface and configured to interface the external device with the shared bus interface.

3. The circuit arrangement of claim 1, further comprising an instruction cache address mapping unit coupled to the program control unit and the instruction cache and configured to map an instruction address request generated by the program control unit into a cache access request to access a cached copy of an instruction requested by the instruction address request.

4. The circuit arrangement of claim 3, wherein the bus control unit comprises a loop control unit configured to select the external device access mode during execution of a subset of instructions in the DSP program that are executed in multiple passes in a loop.

5. The circuit arrangement of claim 4, wherein the bus control unit includes:

(a) a first register configured to store a starting address for the subset of instructions;

(b) a second register configured to store an ending address for the subset of instructions;

(c) a loop counter configured to store a loop count associated with the number of passes that the loop is to be executed; and (d) a comparator configured to compare a current address output by the program control unit with the ending address output from the second register, and in response to a match between the same, to decrement the loop counter and forward the starting address from the first register to the program control unit.

6. The circuit arrangement of claim 4, wherein the instruction decoder is configured to, during a first pass of the loop, fetch each instruction in the subset of instructions from the program memory and cache each such instruction in the instruction cache, and wherein the bus control unit is configured to select the external device access mode during a subsequent pass of the loop.

7. An integrated circuit device comprising the circuit arrangement of claim 1.

8. A program product comprising a hardware definition program that defines the circuit arrangement of claim 1, and a signal bearing medium bearing the program.

9. A circuit arrangement for use in executing a digital signal processor (DSP) program stored in a program memory to process digital signal data, the DSP program including a subset of instructions configured to be executed in multiple passes of a loop, the circuit arrangement comprising:

(a) an instruction decoder configured to receive and decode instructions from the DSP program;

(b) an instruction cache configured to cache a copy of the subset of instructions from the DSP program;

(c) a bus interface configured to selectively couple the instruction decoder to one of the instruction cache and the program memory;

(d) a bus control unit coupled to the bus interface, the bus control unit configured to detect the loop in the DSP program during execution of the DSP program, and in response thereto, to configure the bus interface to couple the instruction decoder to the instruction cache such that instructions from the subset of instructions are retrieved from the instruction cache instead of program memory; and (e) wherein the bus interface comprises a shared bus interface configured to couple to the program memory and an external device over a shared bus, wherein the bus control unit is configured to configure the bus interface to communicate external device data over the shared bus concurrently with retrieval of instructions from the instruction cache.

10. The circuit arrangement of claim 9, further comprising a data bus interface configured to interface with a data memory over a data bus so as to communicate digital signal data with the data memory concurrently with communicating external device data over the shared bus and retrieval of instructions from the instruction cache.

11. A method of processing digital signal data with a digital signal processing (DSP) circuit arrangement, the method comprising:

(a) executing instructions form a DSP program stored in a program memory coupled to a shared bus interface, the shared bus interface further coupled to an external device interface that interfaces an external device with the shared bus interface;

(b) caching at least one instruction form the DSP program in an instruction cache;

(c) concurrently retrieving an instruction from the DSP program from the instruction cache, communicating with a data memory over a data bus interface, and communicating with the external device over the shared bus interface; and (d) wherein concurrently retrieving an instruction from the DSP program from the instruction cache, communicating with a data memory over a data bus interface, and communicating with the external device over the shared bus interface comprises:

generating with a program control unit an instruction address request for the instruction;

generating with an address generator an external device address request for accessing the external device;

routing the external device address request to the external device over the shared bus interface;

routing the instruction address request to the instruction cache; and routing a cached copy of the instruction to an instruction decoder.

12. The method of claim 11, wherein routing the external device address request to the external device comprises controlling a first multiplexer that selectively couples the shared bus to the address generator, and wherein routing the copy of the instruction in the instruction cache to the instruction decoder comprise controlling a second multiplexer that selectively couples the instruction decoder to one of the instruction cache and the shared bus to couple the instruction decoder to the instruction cache.

13. The method of claim 12, further comprising detecting during execution of the DSP program a loop that includes a subset of instructions that are executed in multiple passes in a loop, wherein routing the external device address request to the external device and routing the cached copy of the instruction to the instruction decoder are performed in response to detecting the loop.

14. The method of claim 13, further comprising, during a first pass of the loop, fetching each instruction in the subset of instructions from the program memory and caching each such instruction in the instruction cache, wherein retrieving the cached copy of the instruction from the instruction cache is performed during a subsequent pass of the loop.

15. The method of claim 11, wherein routing the instruction address request to the instruction cache comprises mapping the instruction address request to a cache access request to access the cached copy of the instruction requested by the instruction address request.

16. A method of executing a digital signal processing (DSP) program stored in a program memory to process digital signal data, the DSP program including a subset of instructions configured to be executed in multiple passes of a loop, the method comprising:

(a) detecting the loop in the DSP program during execution of the DSP program; and (b) in response thereto, caching the subset of instructions in an instruction cache during a first pass through the loop;

(c) during a subsequent pass through the loop, fetching instructions from the instruction cache instead of the program memory; and (d) concurrently with fetching instructions from the instruction cache, communicating external device data with an external device to a shared bus to which the program memory is also coupled.

17. The method of claim 16, further comprising, concurrently with fetching instructions from the instruction cache and communicating external device data with the external device, communicating digital signal data with a data memory over a data bus.

* * * * *